Patented May 18, 1948

2,441,927

UNITED STATES PATENT OFFICE 2,441,927

MUCILAGINOUS COMPOSITION

Alexander Adams, Chicago, Ill., assignor to United States Gypsum Company, Chicago, Ill., a corporation of Illinois No Drawing. Application October 5, 1942, Serial No. 460,925

8 Claims. (Cl. 106—193)

The present invention relates to an artificial mucilaginous material of uniform quality and a method of preparation of same.

The principal sources of powdered mucilaginous materials suitable as thickening agents now being used are obtained from natural sources. Various gums, such as tragacanth, arabic, are good examples. While these materials when mixed with water greatly increase the viscosity of the solution even when a comparatively small percentage is used, yet they have certain outstanding disadvantages which limit their utility. One of these is lack of uniformity. During their preparation from the natural sources no serious attempt is made to adjust the uniformity of the product by eliminating inert ingredients such as shells, fiber, bark, etc. Also, the material as found in nature is not uniform. For instance, solutions made therefrom differ widely in properties, as in case of the viscosity. Consequently, each shipment requires an adjustment in the formulation of the composition in which the gum is an ingredient. Likewise, they are not uniform in color and are very seldom pure white, thus interfering with the attainment of good color matching.

It has been found that a dry substance easily dispersible in water and quickly attaining its maximum viscosity can be produced by the process of this invention. In addition, the product of this invention not only attains its maximum viscosity in a very short time, but also maintains the level of the viscosity reached without further increase thereof. Though the particular form of the product produced by this invention is specially useful in the formulation of materials sold in dry form, such as distempers, detergents, foods, etc., it can be with slight modification as known to the man in the art, adapted to other forms of products as it will become evident in view of the statements made herein.

Though for purpose of illustrating the new product methyl cellulose as the preferred material is used, it is not the intention to limit this invention to such material for any mucilaginous substance such as alginates, Irish moss, etc., can be used by a slight variation in the method employed as will be subsequently disclosed.

Methyl cellulose and some natural gums when shredded are somewhat fibrous in character. When in contact with each other, and particularly in the presence of solvating liquid, fibers quickly felt into sheets or have a tendency to agglomerate in ball-like shapes. This property renders intermixing very difficult in a dry or wet composition.

It is apparent that such agglomerates solvate slowly, and as more of the material is dissolved in time, the viscosity increases. In paint compositions, this "false" viscosity misleads the painter, with the result that excessive and uneconomical quantities of dry materials are added to give what is known as the desirable viscosity for application or brushability. The applied paint film, when dry, because of the thickness, does not develop the maximum strength of adhesion to the surface to which it is applied, and frequently may "peel off" or "curl off" such surface.

It is obvious that to obtain uniform viscosity it is necessary to dissolve all the soluble materials present in the composition. Materials or agglomerates of type mentioned above require considerable time for solution and therefore are not commercially as successful as other types. By the process of this invention the maximum viscosity is obtained almost instantaneously without lumping or other undesirable characteristics in the final finished product.

Examples

Though the following examples are given to illustrate the invention, it will be understood that they are not limitations, since modifications will readily occur to those skilled in the art.

Though methyl cellulose is used specifically as one example of a fibrous type of a thickening agent, others can also be used. To obtain a uniform solution 550 pounds of water are used to dissolve 30 pounds of methyl cellulose in the following manner: the methyl cellulose is placed evenly in the bottom of the mixing can or other device used to prepare the solution. It is then moistened with about 185 pounds of water or approximately one-third of the total water needed to make the solution. The water used to dampen the methyl cellulose is added at its boiling temperature. The mass is slowly stirred until there are no more lumps of undissolved material. This may require about one-half hour. The balance of the water which should be cold is added and the mass agitated for about one hour. The temperature should not be over 60° F. at the end of this time and all material in solution. Approximately 970 pounds of whiting are stirred into this solution. Preferably, it should be added in increments of about 50 pounds. After addition of each increment stirring should continue until all lumps disappear. A thick paste will be obtained when all of the whiting has been added. The thick paste is simultaneously dried and ground into a fine dry powder.

This operation eliminates all lumps and offers other advantages, too. A swing hammer kiln mill is suitable for this operation. The paste is fed under pressure into the heated mill in a continuously uniform manner. Hot gases approximately 460° F. effect the drying by circulating through the mill. Conventional equipment may be effectively used. To avoid clogging the pipe lines it is desirable to maintain the temperature of the paste between 35° F. and 105° F. It therefore is necessary to maintain a degree of temperature control, and operate the equipment so that it will perform the process within the desirable range of temperature.

Commercial methyl cellulose of about 4,000 C. P. S. is preferred for illustrative purposes and practice, but other grades and types may be used with a corresponding variation in the formula to conform with the change in viscosity. The viscosity is generally determined on a 2% solution at 20° C. by well known methods.

In the preparation of the dispersion on the carrier, it is desirable to use, rather high viscosity solutions since the stresses set up during the process are very useful in obtaining a uniform and thorough dispersion. Ordinarily about three per cent solutions of the mucilaginous substance is used for dispersion on the carrier. However, when this composition is added to a water thinnable coating composition, it is desirable that not more than one per cent of the actual mucilaginous substance be added. Greater quantities adversely affect the working qualities.

In the preparation of this solution care must be exercised to use water that is substantially free from two or three valent ions as they interfere with attaining a proper and uniform viscosity.

Without limiting the scope of this invention and solely to furnish examples illustrative of applications of the product of this invention, the following examples are given:

*Example 1.—Calcimine*

|   | Percent by weight |
|---|---|
| Clay, finely ground | 19.8 |
| Whiting | 75.0 |
| Glue | 5.0 |
| Dry dispersed mucilaginous substance | .2 |

*Example 2.—Cold water casein paint*

|   | Percent by weight |
|---|---|
| Whiting | 74.1 |
| Clay | 15 |
| Casein | 5 |
| Borax glass | .6 |
| Lime | 5.0 |
| Dry dispersed mucilaginous substance | .3 |

The materials after being thoroughly blended together are ready for use. In either example, water is the vehicle for the binder. A sufficient amount of water is added to the proper amount of material and mixed thoroughly. In a very short time the mixture is uniformly blended into a painting composition, free from lumps, uniform in viscosity and application qualities, and in addition, there is practically no settling of the non-soluble materials such as pigments, fillers, etc., in the container.

Another very important improvement noted in this product is the ability to hold a "wet edge." This is very important in water paints, particularly calcimines, since a dry edge when lapped with a water paint shows the lap or joint very distinctly. Likewise "curtaining" or sagging of the applied paint is avoided by this composition since the instantly soluble mucilaginous material prevents the paint from running.

While the above examples have been given for methyl cellulose, other artificial or natural gums of a fibrous character like alginates can be used. A solution is made therefrom according to a desired predetermined viscosity. Since this is a natural material and not uniform as to viscosity due to the presence of impurities and variation during formation in nature, the per cent by weight will vary appreciably and must be considered in obtaining the desired viscosity. This solution is then mixed with a suitable inert filler such as whiting and subsequently ground and dried to produce a dry product of uniform viscosity. Obviously, other mucilaginous materials can be similarly prepared.

While whiting has been used as an example in carrying out this invention it has been found that other filler materials can be used to advantage such as ground gypsum, talc, ground dolomite, clay, and finely ground silica are satisfactory. It is also possible to add the mucilaginous solution to pigment material such as titanium dioxide, zinc oxide, lithopone, etc. Other base materials may be used which will readily occur to those skilled in the art and still be within the scope of this invention.

It is also within the scope of this invention to use other materials besides water, for alcohol, benzine, and other organic solvent materials can be utilized as the solvent. In such case other thickening materials than those named above would have to be used as each solvent has its own particular way it would effect stiffening.

Having disclosed a practical embodiment of the invention in specific examples and uses to insure a clear understanding of the essence of this invention, it is not intended to be limited thereby for obviously many variations may be made by those skilled in the art and still be within the scope of this invention as limited by the claims.

Having thus described my invention, I claim as new and desire to secure by Letters Patent:

1. The process of preparing an improved mucilaginous substance comprising the steps of heating a portion of the total amount of water required to obtain the desired concentration, adding said heated portion of water to a mucilaginous substance selected from a group consisting of methyl cellulose, water soluble alginates and carbohydrate gums, adding the balance of the water to the dispersed mucilaginous substance, the said water being at a temperature below 60° F., adding with constant agitation and in increments an inorganic carrier, to obtain a thick pasty mass, forcing the said pasty mass thru a grinder to comminute the said pasty mass while simultaneously dehydrating the said comminuted pasty mass.

2. In the process of claim 1 and in combination therewith, the step of maintaining the said pasty mass at a temperature not less than 35° F. and not more than 105° F.

3. A coating composition characterized by substantial freedom from lumping when mixed with water, comprising

| | Per cent by weight |
|---|---|
| Clay | 19.8 |
| Whiting | 75.0 |
| Glue | 5.0 |
| Dry dispersed mucilaginous substance | 0.2 | the said dry, dispersed mucilaginous substance being a substantially inert carrier uniformly coated with not more than three per cent by weight of a mucilaginous substance selected from the group consisting of methyl cellulose, water soluble alginates and carbohydrate gums.

4. The product of claim 3 wherein the said dry, dispersed mucilaginous substance is a substantially inert carrier having a uniform coating of a composition containing not more than approximately three per cent by weight of methyl cellulose.

5. A washable coating composition characterized by its substantial freedom from lumping when mixed with water comprising

| | Per cent by weight |
|---|---|
| Whiting | 74.1 |
| Clay | 15.0 |
| Casein | 5.0 |
| Borax glass | 0.6 |
| Lime | 5.0 |
| Dry dispersed mucilaginous substance | 0.3 |

The said dry, dispersed, mucilaginous substance being a substantially inert carrier uniformly coated with approximately three per cent by weight of a mucilaginous substance selected from the group consisting of methyl cellulose, water soluble alginates and carbohydrate gums.

6. The product of claim 5 wherein the said dry, dispersed, mucilaginous substance is a substantially inert carrier having thereon approximately three per cent by weight coating of methyl cellulose.

7. A coating composition comprising clay, a calcareous filler, a binder and a mucilaginous substance selected from the group consisting of methyl cellulose, water soluble alginates and carbohydrate gums coating on an inert carrier and characterized by ease of solubility and stability of viscosity, the said mucilaginous substance being present in a quantity less than one per cent.

8. A washable coating composition comprising a pigment, a calcareous filler, a binder and solvents therefor, including an alkaline earth hydroxide and a mucilaginous substance selected from the group consisting of methyl cellulose, water soluble alginates, and carbohydrate gums coating on an inert carrier and characterized by ease of solution and stability of viscosity, the said mucilaginous substance being present in a quantity less than one per cent.

ALEXANDER ADAMS.

REFERENCES CITED

The following references are of record in the file of this patent:

UNITED STATES PATENTS

| Number | Name | Date |
|---|---|---|
| 1,055,720 | Deuel | Mar. 11, 1913 |
| 1,937,105 | Thomsen | Nov. 28, 1933 |
| 2,032,071 | Scholz | Feb. 25, 1936 |
| 2,177,154 | Scholz et al. | Oct. 24, 1939 |
| 2,260,882 | Berg | Oct. 28, 1941 |
| 2,312,446 | Schoenbeck et al. | Mar. 2, 1943 |

FOREIGN PATENTS

| Number | Country | Date |
|---|---|---|
| 496,775 | Great Britain | Dec. 6, 1938 |
| 503,349 | Great Britain | Apr. 5, 1939 |
| 516,145 | Great Britain | Dec. 22, 1939 |

OTHER REFERENCES

Scientific Section Circular No. 523 of National Paint, Varnish and Lacquer Association, Washington, D. C., November 1936, pages 379–382. (Copy in Div. 64.)